United States Patent
Cheiky et al.

(10) Patent No.: US 6,743,548 B2
(45) Date of Patent: Jun. 1, 2004

(54) SILVER-ZINC ALKALINE RECHARGEABLE BATTERY (STACKING ORDER)

(75) Inventors: Michael Cheiky, Santa Barbara, CA (US); Wilson Hago, Ventura, CA (US)

(73) Assignee: Zinc Matrix Power, Inc., Santa Barbara, CA (US)

(*) Notice: Subject to any disclaimer, the term of this patent is extended or adjusted under 35 U.S.C. 154(b) by 138 days.

(21) Appl. No.: 09/839,270

(22) Filed: Apr. 19, 2001

(65) Prior Publication Data

US 2002/0182489 A1 Dec. 5, 2002

(51) Int. Cl.[7] .................................................. H01M 2/16
(52) U.S. Cl. ..................... 429/144; 429/255; 429/254; 429/248; 429/229; 429/206
(58) Field of Search ................................ 429/255, 248, 429/229, 206, 144, 254

(56) References Cited

U.S. PATENT DOCUMENTS

| | | |
|---|---|---|
| 4,154,912 A | 5/1979 | Philipp et al. |
| 4,253,927 A | 3/1981 | Bernstein et al. |
| 4,272,470 A | 6/1981 | Hsu et al. |
| 4,327,164 A | 4/1982 | Feinberg et al. |
| 4,371,596 A | 2/1983 | Shibley |
| 4,434,215 A | 2/1984 | Wszolek et al. |
| 4,479,856 A | 10/1984 | Ando |
| 4,592,973 A | 6/1986 | Pemsler et al. |
| 5,164,274 A | * 11/1992 | Kordesch et al. .......... 429/144 |
| 5,302,475 A | 4/1994 | Adler et al. |
| 5,342,659 A | 8/1994 | Horowitz et al. |
| 5,426,004 A | 6/1995 | Bayles et al. |
| 5,626,988 A | 5/1997 | Daniel-Ivad et al. |
| 5,681,672 A | 10/1997 | Lee |
| 5,763,557 A | 6/1998 | Sanduja et al. |
| 5,780,186 A | 7/1998 | Casey, Jr. |
| 5,824,434 A | 10/1998 | Kawakami et al. |
| 5,830,601 A | 11/1998 | Lian et al. |
| 6,033,806 A | 3/2000 | Sugiura et al. |
| 6,153,328 A | 11/2000 | Colburn |

* cited by examiner

Primary Examiner—Patrick Hyan
Assistant Examiner—Angela J. Martin
(74) Attorney, Agent, or Firm—Marvin E. Jacobs

(57) ABSTRACT

A rechargeable, alkaline, zinc-based battery containing a stack of hydrogen permeable cellulose-based films, each one optionally containing a dispersion of metal salts. A film may contain copper salt that reacts with cellulose to prevent zinc dispersion. A second film may contain fluoride salts that react with silver ions to prevent silver plating. A third optional film contains sulfide salts that react with copper ions to form copper sulfide salts to lower copper ion concentration in the electrolyte. The stack may also contain at least one hydrogen-permeable regenerated cellulose film and at least one hydrogen permeable hydrocarbon film such as polypropylene.

19 Claims, 2 Drawing Sheets

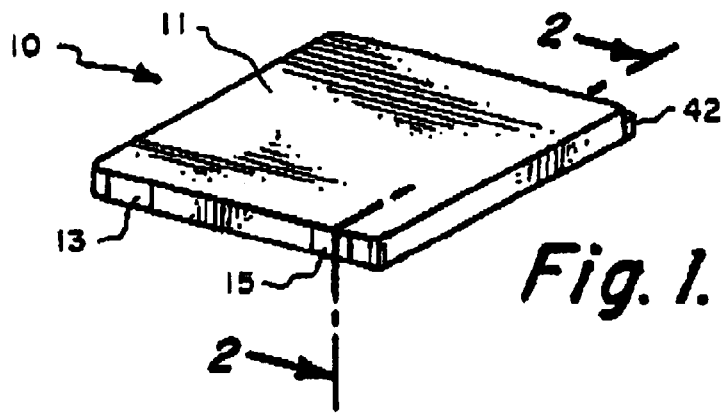
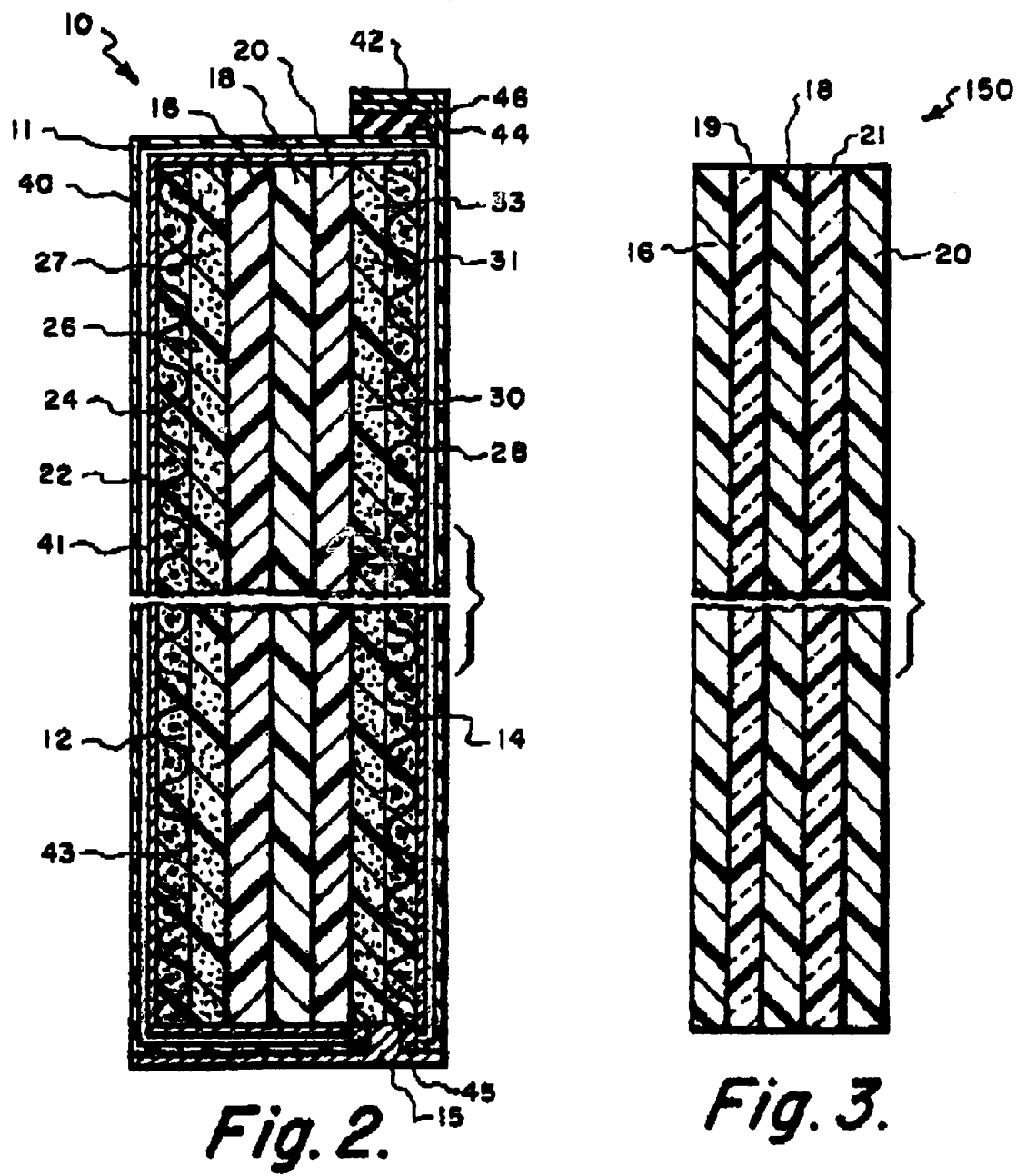

ABSTRACT# SILVER-ZINC ALKALINE RECHARGEABLE BATTERY (STACKING ORDER)

TECHNICAL FIELD

This invention relates to a rechargeable alkaline battery, and more particular this invention relates to an arrangement of separators for a silver-zinc alkaline rechargeable battery.

BACKGROUND OF THE INVENTION

An attractive feature of zinc alkaline batteries and particularly silver-zinc batteries is their high power density. They possess one of the highest gravimetric and volumetric energy densities of commercially available batteries. Additionally, they possess low self-discharge rates as well as high current discharges upon demand.

Despite these advantages, a number of limitations have prevented the more widespread use of these batteries. These batteries have suffered from short cycle life, lasting less than 50 cycles when subjected to field conditions with infrequent cycling. The observed degradation of capacity is due to a combination of several factors. First, there is a change of the scope of the anode electrode due to excessive zinc solubility. Secondly, there is separator degradation via silver migration and plating. Thirdly, there is zinc migration through the separator, leading to premature localized shorts due to the presence of dendrites. Fourth, and final, there is separator degradation by electrolyte.

STATEMENT OF PRIOR ART

One technique dealing with zinc migration involves physically diminishing the presence of zinc in critical areas where dendrite formation is not wanted. Thus, Colburn in U.S. Pat. No. 6,153,328 describes a metal/air fuel cell which contains dendrite elimination zones characterized by the substantial lack of zinc in the volume of the zone and substantial presence of a cell positive electrode through the volume.

Adding complexing agents to the zinc electrode or adding agents to the electrolyte suppresses zinc crystal growth. Lian et al in U.S. Pat. No. 5,830,601 teach an electrolyte active species comprising a metal hydroxide such as KOH or NaOH, and a modifier such as a metal porphine, and/or a polyvinyl resin such as polyvinyl alcohol or polyvinyl acetate to suppress zinc deposition. Kawakami, et al in U.S. Pat. No. 5,824,434 use a multi-layered oxide film next to the zinc. U.S. Pat. No. 5,681,672 by Lee teaches adding barium fluoride to the electrolyte solution as a remedy for zinc dendrites. Adler, et al in U.S. Pat. No. 5,302,475 use an electrolyte containing KOH and a combination of KF and $K_2CO_3$ salts. Ando in U.S. Pat. No. 4,479,856 adds a quaternary ammonium salt and at least two metal ions selected from the group consisting of lead, tin and cadmium ions as dendrite inhibitor to the electrolyte.

Another approach involves changing the electric field experienced by zinc. U.S. Pat. No. 5,780,186 by Casey Jr. discloses a specially treated zinc that fills the pores of a porous metal substrate. The use of indium sulphate as a coating agent for zinc is disclosed in U.S. Pat. No. 5,626,988 by Daniel-Ivad, et al.

Modifying the separators has been disclosed to prevent zinc dendrites. U.S. Pat. Nos. 4,154,912 and 4,272,470 disclose crosslinking of polyvinyl alcohol by acetalization which supposedly forms networks between polymer molecules, thereby impeding zinc migration. In U.S. Pat. No. 6,033,806, Sugiura, et al discuss a similar crosslinked polyvinyl alcohol separator formed by adding an oxidizing agent to effect oxidative cleavage of 1,2-diol units and then acetalizing to form a film of crosslinked polyvinyl alcohol. Pemsler, et al in U.S. Pat. No. 4,592,973 disclose a separator with a hydrophobic, microporous membrane whose pores are filled with a liquid transport agent comprising an organic agent dissolved in an organic solvent. A zinc-dendrite resistant separator made from copolymers of ethylene and acrylic or methacrylic acid is disclosed in U.S. Pat. No. 4,434,215 by Wszolek, et al. Shibley et al disclose in U.S. Pat. No. 4,371,596 a separator made from a porous, flexible substrate coated with an alkaline insoluble thermoplastic rubber-based resin and an alkaline reactive polar organic plasticizer along with polar particulate filler materials. A separator comprising thermoplastic rubber, an inert filler and a processing agent selected from stearic acid, stearic acid metal salts, stearic acid amides, and natural or synthetic waxes is taught in U.S. Pat. No. 4,327,164 by Feinberg et al.

There have been various attempts to modify separators, to control silver plating, as for example in the chemical modification of the surface of regenerated cellulose. In U.S. Pat. No. 5,763,557, Sanduja et al graft a polymer on the surface of a film of regenerated cellulose by contacting the film with a solution of silver nitrate and an alkali-metal hydroxide. This is followed by contacting the surface with a polymerizable monomer and a catalyst. The polymerization takes place directly on the surface molecules of the substrate. Similar techniques are used in U.S. Pat. No. 5,342,659. Similarly, U.S. Pat. No. 4,272,470 discloses crosslinking polyvinyl alcohol resin with a polyaldehyde-polysaccharide crosslinking agent that will confer resistance against degradation.

Another approach to impart resistance against silver degradation has been to add wettability to the surface of a film that would otherwise be hydrophobic. Thus, for example, U.S. Pat. No. 4,253,927 discloses modifying the surface of polyethylene film by grafting carboxyl groups onto the surface of the polyethylene film. Carboxyl groups as carriers for ionic charge through the separator material. U.S. Pat. No. 5,426,004 recommends the use of alternating layers of a low density, radiation-grafted polyethylene layer provided adjacent the silver electrode and a regenerated cellulose film layer provided adjacent the polyethylene layer. Additional alternating layers of polyethylene and cellophane film can be used. Degradation resistance is a natural consequence as long as the degree of grafting is a small fraction of the bulk polymer.

STATEMENT OF THE INVENTION

The present invention controls zinc dendrite formation and metal deposition or plating from metal ions released by the counterelectrode by forming a stack of cellulose separators containing selected, particulate salts that control the concentration of zinc ions and metal cathode ions in the battery cell. The salt-filled cellulose separators are reinforced by the presence of the particulate fillers and are found to be mechanically strong and to have superior ionic transport properties as compared to polyolefin-based separators.

The regenerated cellulose separators utilized in the invention are preferably recombinant separators having dispersed hydrogen permeable domains such as the separators disclosed in co-pending application Ser. No. 09/839,276 entitled RECOMBINANT CELLULOSE SEPARATORS, the disclosure of which is expressly incorporated herein by reference. The domains preferable comprise a cellulose ether containing a $C_2$–$C_{10}$ ether group such as ethylcellulose. The separator is formed by dissolving cellulose in a first solvent and dissolving a hydrogen gas permeable cellulose ether in a second solvent. The solutions are combined and pre-selected metal salt particles are dispersed in the solution. The solvent is removed to form a separator film ultimately having a thickness from 10 microns to 250 microns.

A zinc alkaline battery according to the invention includes a container, preferably a thin, flat 2-part enclosure containing a negative electrode comprising zinc or zinc oxide, suitably dispersed in a gel or polymeric carrier or binder and a positive electrode such as silver oxide. The electrodes can be mounted on conductive supports such as expanded metal or metal screens suitably formed of silver or coated with a layer of silver, copper. Lead, indium, tin or other corrosion resistant metals. The electrodes are separated by a stack of regenerated cellulose films according to the invention.

A separator film facing the cathode preferably has a dispersion of a metal salt that prevents deposition of silver oxide. The preferred salts are metal fluorides that have limited solubility. The fluoride ion slowly dissolves and reacts with silver ions to form a soluble silver fluoride salts that retard or prevent silver deposition on the separator.

An additional separator may optionally be present in the stack that contains a salt of a metal ion that reacts with hydroxyl groups on cellulose and prevents zinc from reacting with the same groups. A copper salt is the preferred moiety as copper is higher in the electromotive series than zinc. This separator contributes to a substantial decrease in migration of zinc from the zinc electrode to the cathode. However, excessive copper can be leached from the separator film and plate on the zinc electrode. Another optional separator film in accordance with the invention contains a dispersion of particles of a salt such as a sulfide that reacts with the copper ions to form an insoluble salt that precipitates. The sulfide containing separator film is preferably isolated from direct contact with the anode by placing a hydrogen-permeable regenerated cellulose separator film between the anode and the sulfide-containing separator.

The stack of cellulose layers can contain additional layers such as at least one hydrogen permeable layer of a hydrocarbon resin such as polyethylene or polypropylene between any of the salt-filled layers, generally from 1 to 5 layers of 50 micron grooved polypropylene such as Celgard. The Celgard further limits zinc ion migration. Additional hydrogen permeable regenerated cellulose layers may be present such as 1–5 layers of recombinant regenerated cellulose not containing a dispersion of salt.

These and many other features and attendant advantages of the invention will become apparent as the invention becomes better understood by reference to the following detailed description when considered in conjunction with the accompanying drawings.

BRIEF DESCRIPTION OF THE DRAWINGS

FIG. 1 is an isometric view of a battery in accordance with the invention.

FIG. 2 is a cross-sectional view taken along line 2—2 of FIG. 1 illustrating a battery containing 3 films of hydrogen permeable cellulose separator films of the same type;

FIG. 3 is a cross-sectional view of a stack of hydrogen-permeable regenerated cellulose separator films interspersed with hydrocarbon separator films;

DETAILED DESCRIPTION OF THE INVENTION

Figure 6:
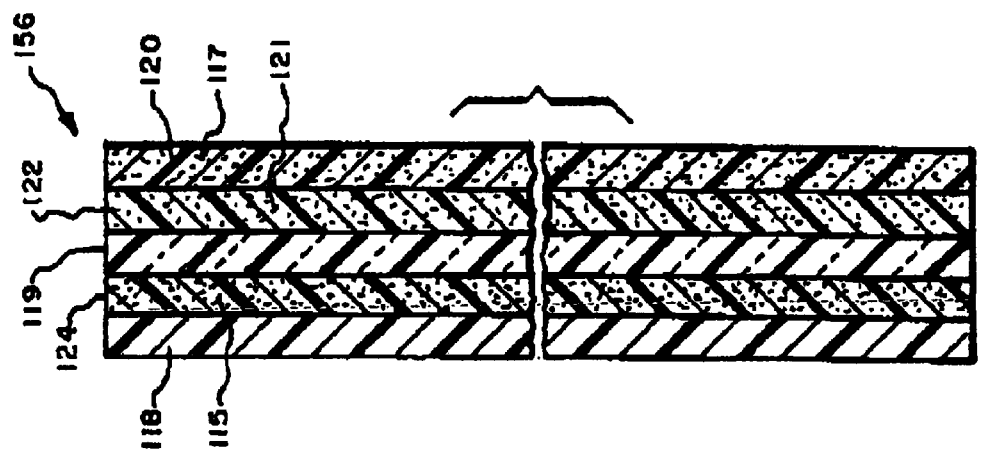
FIG. 6 is a schematic view of a stack of separator films as illustrated in FIG. 4, with the addition of a hydrocarbon layer to the middle of the stack to further reduce zinc migration.

Referring now to FIGS. 1 through 6 a zinc alkaline battery 10 in accordance with the invention includes a case 11 enclosing a zinc containing anode 12, a cathode 14 containing a metal such as silver, separated by a plurality of electrolyte-laden, hydrogen permeable, regenerated cellulose separator layers 16, 18, 20. Battery terminals 13, 15 are connected to the cathode and anode. The separator layers 16, 18, 20 are preferably formed of regenerated cellulose containing 10 to 60 percent by weight based on cellulose of hydrogen permeable domains such as lower alkyl cellulose ethers, the alkyl containing 2–12 carbon atoms. The separator layers 16, 18, 20 can also contain a dispersion of metal salts which react with metal ions dissolved in the electrolyte. As shown in FIG. 3, hydrocarbon layers such as Celgard layers 19, 21 can be added to the stack 150 of separator films.

The anode 12 is formed of a high surface area conductive substrate 22 such as an expanded metal or screen supporting a layer 24 of anode material such as particles 26 of zinc and zinc oxide supported in a polymer matrix 27, particularly the anode paste disclosed in co-pending application Ser. No. 09/839,668 entitled ANODE MATRIX) filed concurrently herewith disclosure of which is expressly incorporated herein by reference. Other suitable matrixes for the zinc, zinc oxide particle are cellulose or polyvinyl alcohol gels.

The cathode 14 also includes a high area conductive substrate 28 such as a silver screen supporting a cathode layer 30, suitably formed of particles 31 of silver and silver oxide pressed with a binder 33 such as Teflon (polytetrafluroethylene).

The separator layers 16, 18, 20 are preferably formed of regenerated cellulose containing hydrogen permeable domains. The separator layers can be unfilled or filled with a dispersion of metal particles. The layers are saturated with alkaline electrolyte, suitably a Group I metal hydroxide such as KOH having a Specific Gravity from 1.0 to 1.5, generally from 1.25 to 1.43.

The battery case 11 is formed of a strong insulator, such as an engineering plastic. If the battery case is impermeable to hydrogen gas, a vent must be provided. The case 11 can be formed of a hydrogen permeable plastic such as ethyl cellulose. The hydrogen-permeable battery case 11 should be enclosed by a hydrogen impermeable film 40 such as a metal 41 coated thermoplastic film 43 such as aluminized polyethylene, polypropylene, vinyl or polyester such as Mylar. Food grade aluminized polyethylene will seal the battery. A vent 42 can be provided in the film enclosure 40 by sealing a plug 44 of hydrogen permeable material such as polypropylene into a reverse fold 46 of the film 40. The terminals 13, 15 extend through apertures in the film 40 and case 11, are potted with a thermoplastic insulator 45 such as low melting polyethylene to insulate the terminals 13, 15 from the metalized film 40 and to form a hydrogen impermeable seal on the apertures.

Figure 4:
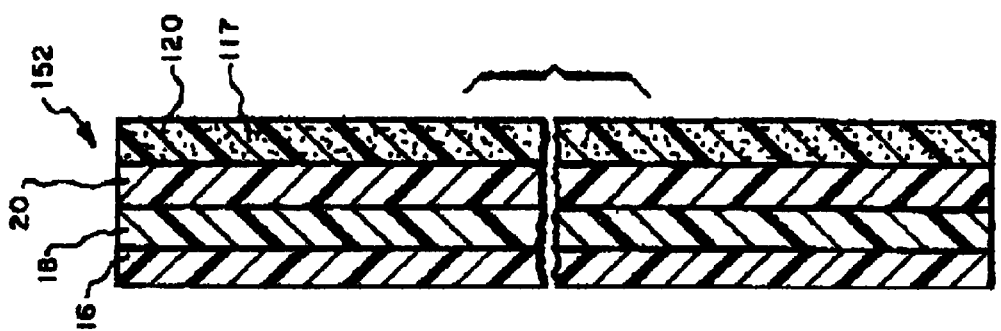
FIG. 4 is a schematic view of a stack of separator films containing a separator film which retards cathode metal deposition placed adjacent the cathode.

Referring now to FIG. 4, a stack of films 152 is illustrated in which the regenerated cellulose separator film 120 adjacent to the cathode 14 contains particles 117 of a fluoride salt such as $CaF_2$ which prevents silver plating while hydrogen permeable cellulose separators 16, 18 and 20 are closest to the anode 12.

Figure 5:
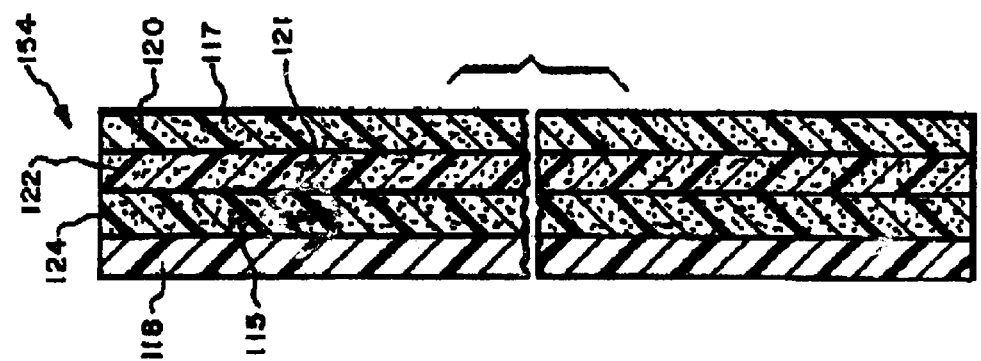
FIG. 5 is a schematic view of a stack of hydrogen permeable separator layers, the first containing a dispersion of particles of a first salt which retards cathode metal deposition, the second containing a second salt which retards zinc dendrite formation and the third containing a third salt which controls the concentration of the second salt.

Referring now to FIG. 5, a stack 154 of separator films is illustrated in which a regenerated cellulose separator film 122 adjacent to the separator film 120 contains particles 121 of a copper salt which reacts with cellulose hydroxyl groups to prevent zinc deposition. To the left and adjacent to separator film 122 is placed a separator film 124 which contains particles 115 of a sulfide salt. The particles 115 of a sulfide salt control the concentration of copper ions in the electrolyte. A regenerated cellulose separator film 118 without a dispersion of salt can be placed adjacent to the anode 12.

FIG. 6 illustrates a stack 156 of separators in which a regenerated separator 120, containing particles 117 of a fluoride salt, is placed next to the cathode, not shown. An unfilled regenerated cellulose film 118 is placed next to the anode 12 while a Celgard film 119 is placed between a copper containing film 122 and the sulfide containing film 124.

The separators are cast from a cellulose solution. A solution of cellulose, with a degree of polymerization from 200 to 1200, in the form of, but not limited to, microcrystalline cellulose, cotton fiber, paper and microgranular cellulose, is dissolved using a variety of different solvents, including, but not limited to, LiCl/DMAC, trifluoroacetic acid and N-morpholine N-oxide. With LiCl/DMAC the applicable range is 3 to 8% wt LiCl to DMAC and the applicable range for the percent weight solution of cellulose to solvent is 1 to 11%. The cellulose may be crosslinked with a variety of methods, including reacting it with lower alkyl dihalides as disclosed in copending application Ser. No. 09/839,324 entitled HOMOGENEOUS SEPARATOR the disclosure of which is expressly incorporated herein by reference.

In the case of the cellulose separator nearest the cathode, a fluoride containing salt, in the solubility range of 10 μg/ml to 10 mg/ml is added to the solution as suspension in a concentration range from 2 to 25% by weight of cellulose. Salts meeting this criteria include, but are not limited to, calcium fluoride, magnesium fluoride, lead fluoride, barium fluoride, mercury(I) fluoride and strontium fluoride. The resulting separator has resistance to silver plating.

The middle cellulose separator, which controls zinc dendrite formation, contains a copper(I)- or (II)-containing salt in the solubility range 10 μg/ml to 10 mg/ml. The salt is added to the solution as a suspension in a concentration range from 2 to 25% by weight of cellulose. Salts meeting this criteria include, but are not limited to, copper hydroxide, copper oxalate, copper iodide, copper cyanide, and copper phosphate. This separator aids in controlling zinc migration.

For the optional cellulose separator layer, a sulfide-containing salt for controlling copper concentration with solubility less than 1 mg/ml is added to the solution as suspension in a concentration range from 2 to 25% by weight of cellulose. Salts meeting this criteria include, but are not limited to, indium sulfide, bismuth sulfide, zinc sulfide, tin sulfide, lead sulfide, cadmium sulfide and silver sulfide.

The gelling agents used may be chosen from any number of conventional gelling agents, including polyethylene oxide, polyacrylic acid, cellulose, starch, and gums such as guar gum. The preferred embodiment uses a gelling agent described in Co-patent application Ser. No. 09/839,276, entitled RECOMBINANT CELLULOSE SPARATORS the disclosure of which is hereby incorporated by reference. This matrix material diminishes zinc migration and zinc dendrite formation as well as exhibits hydrogen permeability, accommodation to zinc density changes and resistance to electrolyte degradation.

EXAMPLE

A battery is made with the following ingredients:

| Zinc | 4.2 g |
|---|---|
| Zinc oxide | 1.5 g |
| 1.38 Specific Gravity KOH | 1.8 g |
| Gelling agent | 0.38 g |
| Silver Oxide | 8.8 g |

The separators are made as follows:

40 grams of microcrystalline cellulose (MCC, Aldrich 31,069-7) is placed in a solution of 2 kg of 5% LiCl/DMAC and heated to 122 degrees Celsius for 15 minutes. The cooled solution affords a clear solution of MCC. 26.7 grams of ethyl cellulose (EC) is dissolved in 530 ml DMAC separately. The MCC and EC solutions are combined in a 60/40 weight ratio by polymer weight. The following separators were made according to the specified amount of salt added:

| SEPARATOR A | NO SALT |
|---|---|
| SEPARATOR B | 8.0 g Cu $(OH)_2$ |
| SEPARATOR C | 3.3 g $CaF_2$ |
| SEPARATOR D | 10.5 g $Bi_2S_3$ |

The respective salts are added to the solution which is stirred for 15 minutes. 40 ml of the combined solution is placed on a glass tray. A humidifier providing water over the glass tray yields a gelled product containing phases of MCC and EC. This gel is then washed with water repeatedly until all DMAC and LiCl are removed. The gel is then dried with a press-dry, affording a film having a thickness of from 80 microns useful as a separator.

Some of the separators are illustrated in the drawings.

All batteries built containing the stacks of separators illustrated in the drawings were cycled to 90% discharge at a C/5 rate. They showed a marked improvement over batteries using conventional regenerated cellulose separators during its first 50 cycles.

It is to be realized that only preferred embodiments of the invention have been described and that numerous substitutions, modifications and alterations are permissible without departing from the spirit and scope of the invention as defined in the following claims.

What is claimed is:

1. A rechargeable, alkaline battery including an anode electrode, a cathode electrode, said electrodes being separated by a stack of at least 2 hydrogen permeable regenerated cellulose films, at least one of the films containing a dispersion of salt particles and the films including domains permeable to hydrogen gas.

2. A battery according to claim 1 in which the anode electrode contains zinc and one of the regenerated cellulose films contains a dispersion of copper salt particles.

3. A battery according to claim 2 further including a film of regenerated cellulose containing a dispersion of particles of metal sulfide that react with copper ions to form copper sulfide.

4. A battery according to claim 1 in which the cathode electrode contains silver and one of the regenerated cellulose films contains a dispersion of fluoride salt particles.

5. A battery according to claim 1 in which the stack of regenerated films further includes at least one hydrogen permeable layer of hydrocarbon polymer.

6. A battery according to claim 5 containing 1–5 layers of the hydrocarbon polymer.

7. A battery according to claim 1 in which the stack contains at least one hydrogen-permeable regenerated cellulose film absent salt particles.

8. A battery according to claim 7 in which the regenerated cellulose film absent salt particles is disposed between the copper salt containing regenerated cellulose file and the anode.

9. A battery according to claim 3 in which the copper salt containing regenerated cellulose film is disposed between the metal sulfide salt containing regenerated cellulose film and the fluoride salt particles containing regenerated cellulose film.

10. A battery according to claim 6 in which a layer of hydrogen permeable hydrocarbon polymer is disposed between the copper salt containing regenerated cellulose film and the metal sulfide containing regenerated cellulose film.

11. A battery according to claim 6 in which the hydrocarbon polymer is a polyalkylene of a monomer containing 2–8 carbon atoms.

12. A battery according to claim 11 in which the hydrocarbon polymer is selected from the group consisting of polyethylene and polypropylene.

13. A battery according to claim 1 in which the films have a thickness from 10 to 250 microns.

14. A battery according to claim 1 in which the regenerated cellulose film contains from 10 to 80 parts by weight of the hydrogen permeable domains based on 100 parts of regenerated cellulose.

15. A battery according to claim 14 in which the domains comprise a cellulose ether.

16. A battery according to claim 15 in which the ether is ethyl cellulose.

17. A battery according to claim 4 in which the regenerated cellulose file adjacent the cathode contains a dispersion of a fluoride salt have a solubility of 10 $\mu$g/ml to 10$\mu$/ml.

18. A battery according to claim 2 in which the copper salt has a solubility from 10 $\mu$g/ml to 10 mg/ml.

19. A battery according to claim 3 in which the metal sulfide has a solubility of less than 1 $\mu$g/ml.

* * * * *